United States Patent
Kubin et al.

(10) Patent No.: US 7,540,237 B2
(45) Date of Patent: Jun. 2, 2009

(54) PRINTER

(76) Inventors: Dale K. Kubin, 35560 Grand River Ave., #434, Farmington Hills, MI (US) 48335; Nathan P. Scherdin, 35560 Grand River Ave., #434, Farmington Hills, MI (US) 48335

( * ) Notice: Subject to any disclaimer, the term of this patent is extended or adjusted under 35 U.S.C. 154(b) by 180 days.

(21) Appl. No.: 11/335,381

(22) Filed: Jan. 19, 2006

(65) Prior Publication Data

US 2006/0174785 A1 Aug. 10, 2006

Related U.S. Application Data

(60) Provisional application No. 60/645,544, filed on Jan. 19, 2005.

(51) Int. Cl.
*B41F 17/24* (2006.01)
*B41J 2/01* (2006.01)

(52) U.S. Cl. .............. 101/44; 101/35; 101/40; 400/693; 720/619; 347/104; 347/2

(58) Field of Classification Search .......... 101/4, 101/35, 40, 44; 347/2, 104, 108; 400/70, 400/693; 720/619; 414/796.9; 294/93
See application file for complete search history.

(56) References Cited

U.S. PATENT DOCUMENTS

| | | | |
|---|---|---|---|
| 5,000,651 A | 3/1991 | Akagawa et al. | |
| 5,317,337 A | 5/1994 | Ewaldt | |
| 5,423,619 A * | 6/1995 | Kohno | 400/525 |
| 5,518,325 A * | 5/1996 | Kahle | 400/70 |
| 5,734,629 A | 3/1998 | Lee et al. | |
| 5,873,692 A | 2/1999 | Costas | |
| 5,914,918 A | 6/1999 | Lee et al. | |
| 5,927,208 A | 7/1999 | Hagstrom et al. | |
| 6,041,703 A | 3/2000 | Salisbury et al. | |

(Continued)

FOREIGN PATENT DOCUMENTS

DE 10010521 A1 11/2000

(Continued)

OTHER PUBLICATIONS

Aleratec, www.aleratec.com, DVD/DC Auto Publisher One—16x Autoloading Duplicator with Direct to Disc Printer—Part #280105. Site last referenced May 23, 2006.

(Continued)

*Primary Examiner*—Leslie J Evanisko
*Assistant Examiner*—Matthew G Marini
(74) *Attorney, Agent, or Firm*—Dobrusin & Thennisch PC

(57) ABSTRACT

The present invention provides an improved printer and recording device having an improved design for providing efficient operation and improved print and recording speed to one or more storage devices. In one aspect, the present invention meets the above needs by providing a printer having printing means adapted to operate independently from a transportation mechanism of a storage device. In another aspect, the present invention provides a printer having one or more removable cartridges for the supply and/or removal of completed storage devices from the print device. In yet another aspect, the present invention provides a new and improved engaging feature, of the transportation mechanism, for the selection and transportation of the storage device through the recording and/or printing process of the storage device.

20 Claims, 12 Drawing Sheets

U.S. PATENT DOCUMENTS

| | | | |
|---|---|---|---|
| 6,074,031 A * | 6/2000 | Kahle | 347/4 |
| 6,321,649 B1 | 11/2001 | Vangen et al. | |
| 6,327,230 B1 | 12/2001 | Miller et al. | |
| 6,341,114 B1 | 1/2002 | Nguyen et al. | |
| 6,354,502 B1 | 3/2002 | Hagstro et al. | |
| 6,580,444 B1 * | 6/2003 | Drynkin et al. | 347/171 |
| 6,760,052 B2 | 7/2004 | Cummins et al. | |
| 6,802,070 B2 | 10/2004 | Britz et al. | |
| 6,827,509 B2 * | 12/2004 | Suden et al. | 400/120.01 |
| 6,848,113 B2 * | 1/2005 | Klein | 720/619 |
| 6,988,838 B2 | 1/2006 | Inokuchi et al. | |
| 7,009,632 B2 | 3/2006 | Sawyer | |
| 7,036,131 B2 | 4/2006 | Pedersen et al. | |
| 7,059,697 B2 | 6/2006 | Takahashi et al. | |
| 7,061,515 B2 | 6/2006 | Cummins et al. | |
| 7,145,841 B1 | 12/2006 | Miller | |
| 7,146,620 B2 | 12/2006 | Klein | |
| 7,150,573 B2 | 12/2006 | Cummins et al. | |
| 2003/0222928 A1 * | 12/2003 | Cummins et al. | 347/2 |
| 2005/0069344 A1 | 3/2005 | Cummins et al. | |
| 2005/0125815 A1 | 6/2005 | Klein | |
| 2005/0151825 A1 | 7/2005 | Sukigara et al. | |
| 2005/0157605 A1 * | 7/2005 | Lilland et al. | 369/30.36 |
| 2005/0160435 A1 | 7/2005 | Hagstrom | |
| 2005/0179709 A1 | 8/2005 | Salisbury et al. | |
| 2007/0025794 A1 | 2/2007 | Kubin et al. | |
| 2007/0109381 A1 * | 5/2007 | Liao et al. | 347/101 |

FOREIGN PATENT DOCUMENTS

| | | |
|---|---|---|
| EP | 1057651 A2 | 12/2000 |
| WO | 03/102944 A2 | 12/2003 |
| WO | 2005/120842 A1 | 12/2005 |
| WO | 2007/084948 A1 | 1/2007 |

OTHER PUBLICATIONS

Aleratec, www.aleratec.com, DVD/CD Auto Copy Tower—Part #280104. Site last referenced May 23, 2006.

Disc Robotics CD1-PCI-LT(1-52X CD Burner, Printer, LCD Monitor) http://www.essential-data.com/dri_cd1-pci-It.html. Site last referenced Sep. 13, 2004.

Primera Bravo Disc Publisher, All-in-one CD Printer and Duplicator, http://cdrecordingsoftware.com/bravoce.html. Site last referenced Sep. 13, 2004.

Rimage 2000i Desktop CD/DVD Publisher, http://cdrecordingsoftware.com/rim2000i.html. Site last referenced Sep. 13, 2004.

International Search Report PCT/US2007/060702 (Jan. 18, 2007) (WO2007/084948A1).

Primera, Primera Announces Bravo™ XRn Network Disc Publisher at NAB 2007, published Apr. 17, 2007.

Roland, Color Camm, PC-12, available at, http://www.rolanddga.com/products/printcut/colorcamm/pc-12/ , last accessed Jan. 7, 2005.

Epson, Epson R200 Stylus Photo Inkjet, available at http://www.misco.co.uk/productinformation/~74065~WW~ns~/EPSON%20R200%20ST, last accessed Mar. 24, 2005.

Epson, Epson R200 Stylus Photo Inkjet, available at http://www.misco.co.uk/productinformation/~74065~WW~es~/EPSON%20R200%20STY, last accessed Mar. 24, 2005.

Epson, http://www.earth.umecit.maine.edu/buyermod/uploads.427088.jpg. last accessed Mar. 24, 2005.

Epson, available at, http://www.discandink.co.uk/acatalog/R200.jpg, last accessed Mar. 24, 2005.

Available at, http://www.images.google.cm/images?imgurl=http://www.discandink.co.uk/acatalog/R200.jpg., last accessed Mar. 24, 2005.

Available at, http://www.winmagazine.nl/images/articles/digifoto/K3-epson_r200_400.jpg, last accessed Mar. 24, 2005.

Available at, http://images.saleshound.com/broadreach/dyn_li/200.0.75.0/Retailers/Staples/s0066902.jpg, last accessed Mar. 24, 2005.

Available at, http://www/ixbt.com/cm/news/2004/m2/epson-r200.jpg, last accessed Mar. 24, 2005.

International Search Report PCT/US2007/060702 (Jun. 16, 2008) (1323-001WO)—ISR#2.

Co-pending U.S. Appl. No. 11/844,593, filed Aug. 24, 2007.
Co-pending U.S. Appl. No. 11/844,598, filed Aug. 24, 2007.
Co-pending U.S. Appl. No. 12/049,605, filed Mar. 17, 2008.
Co-pending U.S. Appl. No. 11/844,740, filed Aug. 24, 2007.
Co-pending U.S. Appl. No. 12/109,005, filed Apr. 24, 2008.
Co-pending U.S. Appl. No. 12/061,906, filed Apr. 3, 2008.

* cited by examiner

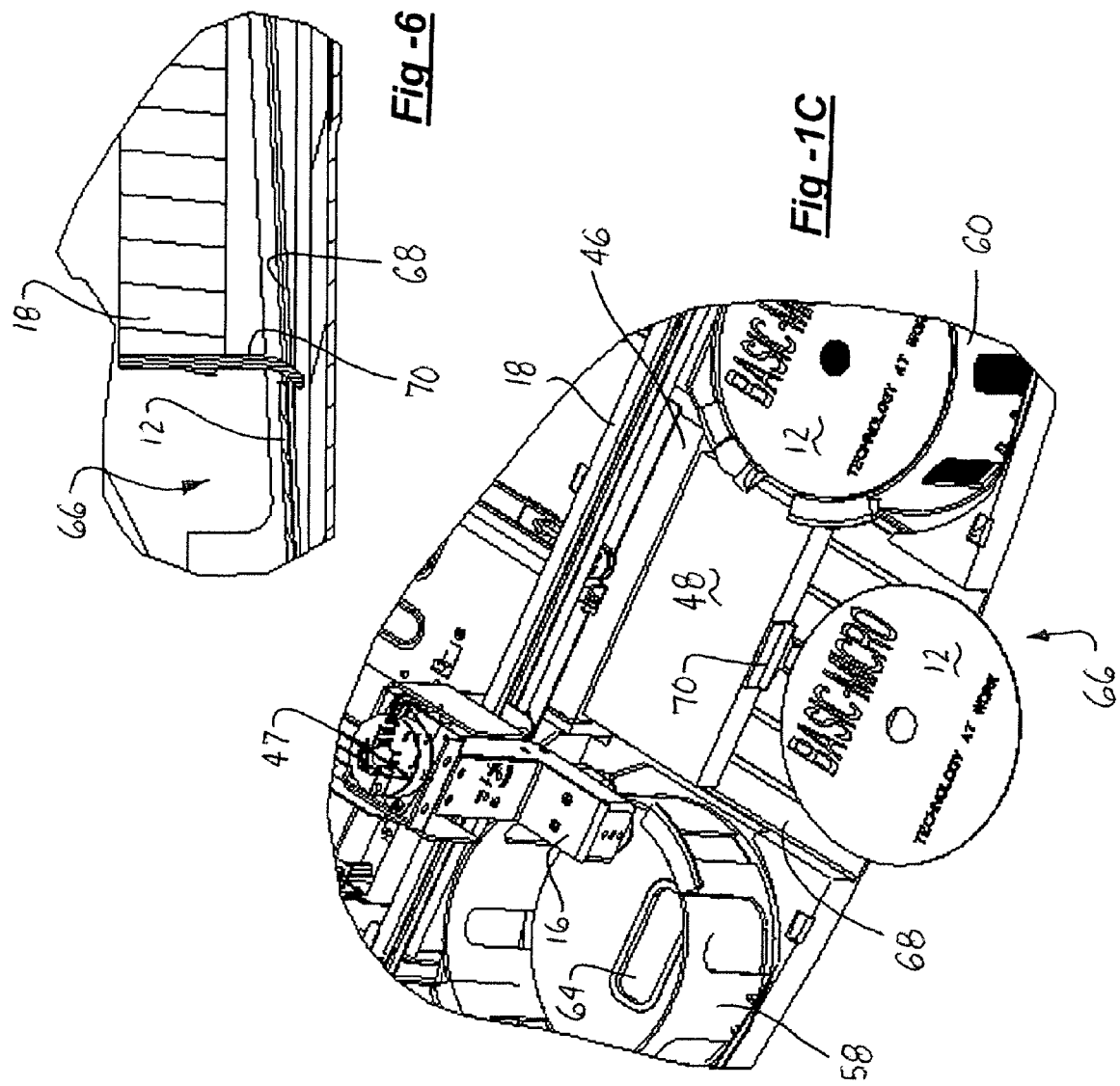

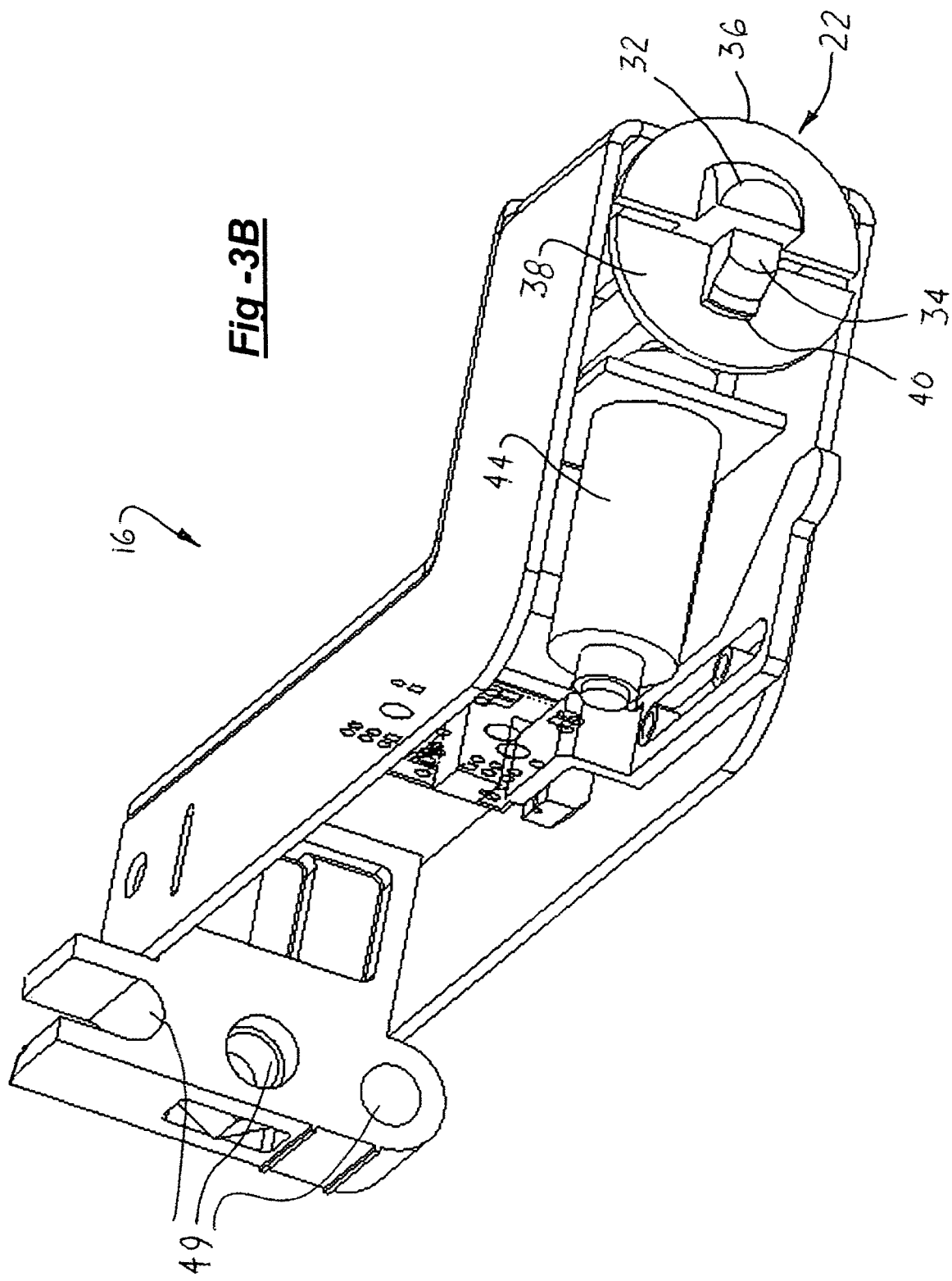

PRINTER

CLAIM OF PRIORITY

The present invention claims the benefit of the filing date of U.S. Provisional Application Ser. No. 60/645,544, filed Jan. 19, 2005, which is incorporated herein by reference for all purposes.

TECHNICAL FIELD

The field of the present invention relates to print devices and more particularly to printers adapted to print to a plurality of disc and optionally record information thereto.

BACKGROUND

The development of computer recording devices has inspired users to seek the retention of documents, files, pictures, music, videos, or otherwise, through digital means. While numerous devices have been developed for the storage of information, one particularly inexpensive and reliable means include the recording of information on optically readable discs. With these relatively small discs, large volumes of information can be reliable stored at a relatively nominal cost.

In response to these desired features, the computer industry has developed different types of recording and storage devices to provide users, e.g., personal or business, with recording ability. By example, some of the storage devices available include recordable compact discs, digital video discs, mini-disc, other media discs, or otherwise, wherein information is recorded to the storage devices, via a recording device, using optical means.

With the increase utilization of disc storage devices, identification of these discs has become crucial to insure identification and organization of the same. The disc storage industry has responded to this need by providing discs adapted to be written to (e.g., with a marker or otherwise) and/or labels for placement on the same. However, the end product of these hand written identification devices have left the consumer often dissatisfied due to less then satisfactory and inconsistent appearance of the disc. Furthermore, the printing of labels and subsequent placement onto a disc can become cumbersome and costly, particularly with larger recording projects. For example, the above methods of identification may be particularly problematic when creating 10, 25, 50 or more discs, as may be done with certain music recording projects, product information discs for clients, or otherwise.

In response to the above identification techniques, the print industry has developed printers adapted to print directly to these storage devices (e.g., disc or otherwise). Accordingly, these storage devices are configured with a printable surface adapted to be printed onto using common printing techniques, such as inkjet printing, thermal printing, laser printing or otherwise. However, the printers currently available to the market are often costly, unnecessarily large, and slow in operation, none of which are practical for personal and/or small business use.

Furthermore, often these printers require overly burdensome user participation in printing to one or more storage devices. For example, certain printers require a user to manually feed storage devices to the printer. Alternatively, a printer may require continuous replenishment of supply storage devices within the print device. Accordingly, this may require continuously accessing a supply region of the print device, and manually placing storage devices at the supply location. This process may be time consuming when considering the location of the supply region and the limited maximum number of storage devices, which can be placed within many prior art printers. Also, in view of the interruption in print operation that typically occurs during replenishment of these storage devices, additional time consumption can also be expected.

In view of the foregoing, there is a need for a disc printer, which is advantageously priced for individuals and small business. Furthermore, there is a need for a printer adapted for printing to a plurality of storage devices without substantial interference in the operation of the device. Furthermore, there is a need for printer that is efficiently designed to improve print speed to storage devices.

SUMMARY OF THE INVENTION

The present invention overcomes the drawbacks of the prior art by providing a printer having an improved design, which provides more efficient operation and improved print speed to one or more storage devices. Advantageously, this new design further provides an economically priced printer, which is advantageously sized for an individual use, small business, or otherwise, and which is more user friendly than prior art printers.

In one aspect, the present invention meets the above needs by providing a printer having printing means adapted to operate independently from a transportation mechanism of a storage device. Advantageously, this detached configuration allows for greater versatility of a transportation mechanism by, in one example, providing transportation of a first storage device while printing to a second storage device. Furthermore, this detached configuration allows for an increased range of motion, particularly vertical motion, of the transportation mechanism such that the amount of supply devices, stored with the print device, can be maximized.

In another aspect, the present invention provides a printer having one or more removable cartridges for the supply and/or removal of completed storage devices from the print device. Accordingly, the device provides uninterrupted print operation due to the ability to quickly replace depleted supply cartridges or exchange filled storage cartridges.

In yet another aspect, the present invention provides a new and improved engagement feature for the selection and transportation of a storage device through the recording and/or printing process of the storage device. Other advantages of the present invention are disclosed herein.

Accordingly, in one exemplary configuration, the present invention meets the above needs by providing a printer and recording device for digital storage devices. The apparatus includes a transport mechanism movably attached to a first member. The transport mechanism includes an engagement feature adapted for engagement with a storage device at a source location. The transport mechanism is also adapted to move the storage device from the source location to at least one other location. The apparatus also includes a print mechanism adapted to print to the storage device. The print mechanism includes a moveable print tray adapted to receive the storage device from the transport mechanism and a printer head movably attached to a second member, wherein the printer head and tray are adapted for sequenced movement to cause printing of a design or otherwise to the surface of the storage device. Upon completion of printing, the transport mechanism moves the storage device to a storage location. Advantageously, the first member, second member and disc tray are supported by a housing.

Optionally, the printer may further include a recorder having an extendable tray for receiving the storage device from the transport mechanism, wherein the recorder is adapted to record digital information to the storage devices either before or after printing to the storage device. Additionally, the printer may be further configured with one or more replaceable storage device cartridges, or the like, for providing a continuous supply of storage devices for printing and/or recording thereto and for removal of completed (e.g., recorded and/or printed) storage devices.

DESCRIPTION OF THE DRAWINGS

FIG. 1C illustrates another perspective view of the embodiment shown in FIG. 1B.

FIG. 3B illustrates a perspective view of a second suitable transport mechanism of the present invention.

FIG. 6 illustrates is a simplified cross sectional view through a recording device of the present invention.

DETAILED DESCRIPTION OF THE PREFERRED EMBODIMENT

Figure 1A:
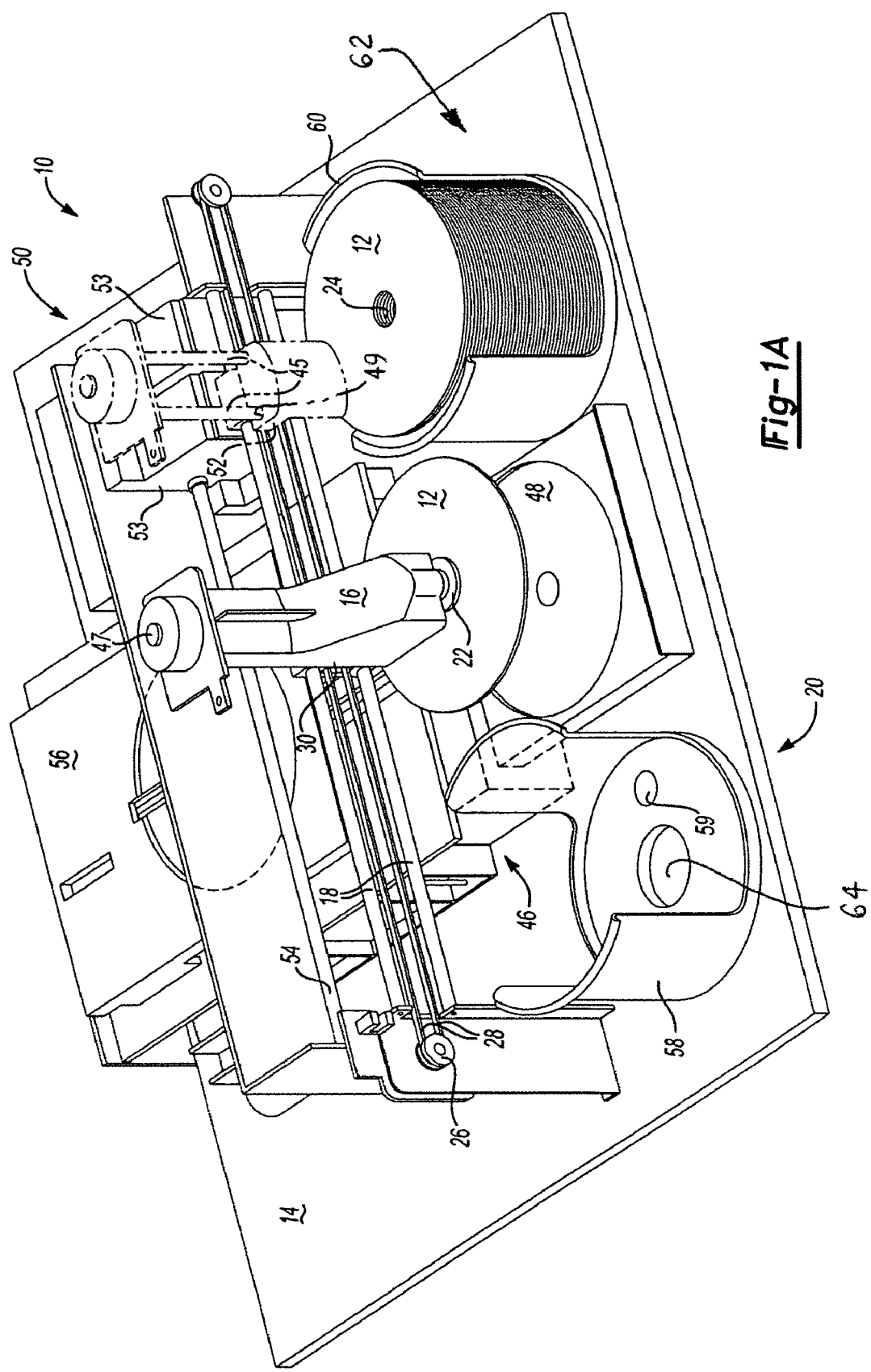
FIG. 1A illustrates a perspective view of one embodiment of the present invention.

The present invention provides a printing device and method for printing to one or more storage devices including, but not limited to: compact discs, digital video discs, mini discs, the like, combinations thereof or otherwise. Advantageously, the device is adapted to provide printing to a disc, which preferably is separate in operation to that of a transport mechanism (e.g., the transportation mechanism and printing mechanism are not movably attached). Accordingly, the device is adapted to simultaneously perform multiple task (e.g., printing to a first disc while transporting a second disc or otherwise). This separation of operation provides more efficient functioning of the device resulting in faster printing capabilities and other advantageous as implicitly or explicitly disclosed herein.

Advantageously, the device may further include a recording means for recording digital information to a storage device, such as a compact disc, digital video disc, mini disc or otherwise. Accordingly, in view of the independent movement of the transportation mechanism, it should be appreciated that the device is adapted to simultaneously print to a first disc, record digital information to a second disc and provide transportation to a third disc. Furthermore, it should be appreciated that the device is capable of simultaneously printing, recording or movement of one or more discs. Still further, it should be appreciated that the print device may include more than one recording, printing and/or transportation means. Other configurations should be appreciated.

In yet another preferred embodiment, the device further comprises one or more removable disc supply cartridges, one or more removable disc storage cartridges, or a combination thereof. The disc supply and storage cartridges allows a user to place a plurality of discs in a supply cartridge and place the cartridge at a disc supply area, which is accessible by the transport mechanism. Preferably, the disc supply cart or storage cartridge includes one or more features for locating the same or the housing of the print device. The discs are then printed and/or recorded to and subsequently placed at a disc storage area, and preferably in a storage cartridge for removal by a user. Accordingly, a user can place or replace a plurality of blank disc at the supply area and retrieve a plurality of completed discs at the storage location (e.g., recorded and/or labeled) without substantial interruption of the operation of the print device. Also, with the decoupling of the transportation mechanism and print mechanism, the transportation mechanism can be movably located at a higher position relative to a supply and storage area, as compared to prior art printers, thereby allowing for greater capacity of discs that may be placed at the supply and storage area.

Referring to the drawings, exemplary embodiments and features of the present invention are shown. The present invention provides a print device 10 for copying, printing and/or recording of one or more storage devices, such as disc 12. The device includes a housing 14 adapted to provide support and enclosure for one or more of the components of the device. Preferably, the housing is relatively small such that it can be placed upon a desktop or the like. However, the housing may be substantially larger as it is contemplated that the device may comprise numerous components (e.g., recording devices, print devices, or otherwise), which may or may not be alike.

The print device includes a transport mechanism 16 adapted to engage and move one or more discs, preferably one at a time. The transport mechanism is movably mounted to a first slide member 18, which extends along at least a portion of the housing and is mounted or otherwise secured thereto. Preferably, the first slide member includes a bearing surface for minimizing friction between the transport mechanism and first slide member. The mounting of the transport mechanism to the first slide member provides slidable movement of the transport mechanism along a first axis such that a disc may be moved substantially along the same path. The disc source location is adapted to receive and/or store a plurality of discs, as discussed herein. Accordingly, preferably the transport mechanism is configured with a disc engaging feature 22, adapted to attach to a portion of a disc, and preferably in a disc hole 24 formed therein, for subsequent movement of the disc along the first axis.

As previously mentioned, the transport mechanism is adapted to move along a substantial portion of the first slide member. Accordingly, the device further includes drive means 26 linkably attached to the transport mechanism, via a linkage 28 or otherwise, to provide a suitable force to move the transport mechanism to various points along the first slide members. Suitable drive member may include a stepper motor or other suitable drive members used for moving a printer component along a bearing surface or the like. Suitable linkages include belts, cables, chains, screws, the like or otherwise. In a preferred embodiment, the linking mechanism comprises a belt. However, it should be appreciated that numerous types of drive assemblies and linkages are available and may be used, as are commonly utilized in the design of inkjet printers.

The first slide member 18 may comprise of any member adapted to guide an attached member along a portion of its length, width or otherwise. Suitable guiding feature include tracks, shafts, rails, grooves, the like or otherwise. In a preferred embodiment, the first slide member comprises an elongated member adapted to fit within a recess and/or opening 30 formed in the transport mechanism. Accordingly, it should be appreciated that the opening comprises a corresponding shape to that of the first slide member to form a secure fit between the first slide member and transport mechanism. Suitable elongated members includes: shafts, rods, beams, rails, the like or otherwise. However, a most preferred elongated member comprises a rod having a low friction surface such with a bearing surface.

As previously mentioned, the transport mechanism includes a disc engaging feature 22 adapted to selectively engage a disc portion. Referring to FIG. 3A-5B, exemplary disc engaging features are shown. The engaging feature includes a first finger 32 and a corresponding second finger 34. The combined first and second finger form a diameter that generally corresponds to the disc hole 24 formed in the disc 12 and are adapted to move relative to each other. In a first position, the fingers are in a closed position wherein the resulting diameter of the fingers is less than the diameter of the disc hole. Accordingly, the finger can move into the disc hole without substantial interference. In a second position, the fingers separate and form a diameter that is equal to, or greater, than the diameter of the disc hole such that the fingers engage the inner walls of the disc hole to prevent the disc from disengaging from the disc engager. It should be appreciated that the fingers engage the interior walls of the disc hole and optionally form a friction fit through an application of pressure by the fingers. Optionally, the first and/or second finger may include a tapered end portion for assisting in the alignment and insertion of the fingers into the disc hole.

Optionally, the first and/or second finger includes one or more additional features for assisting in the engagement with a disc. The first and second flanges are adapted to move flush with the disc, which advantageously assists in the positioning of the engaging feature with a disc. For example, referring again to the drawings, the first and second fingers further include a first and second flange 36, 38 respectively. Preferably, the first and second flange are adjacently located from each other and located towards an end portion of the first or second finger.

Figure 4A:
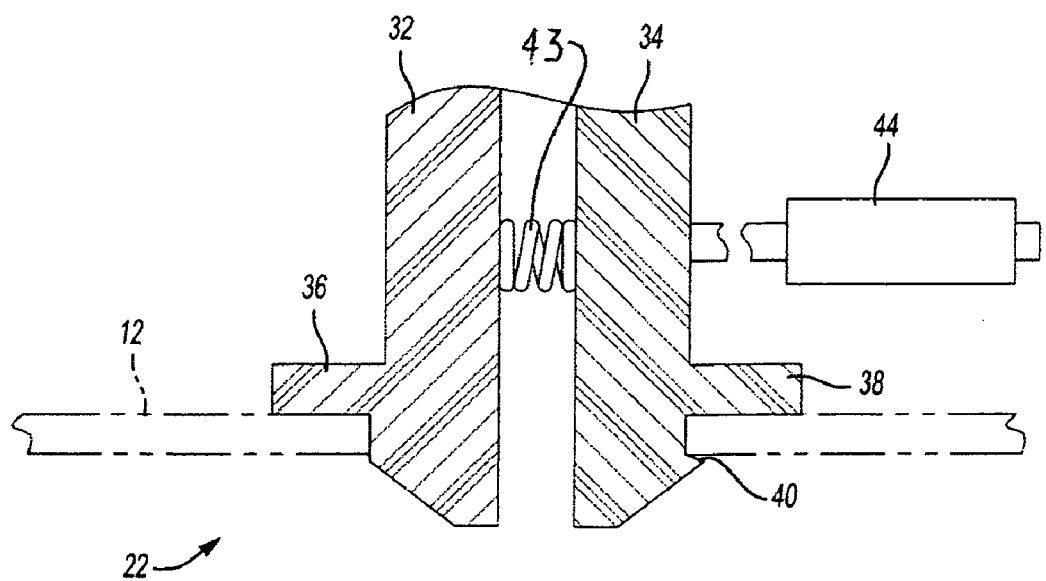
FIG. 4A illustrates a cross-sectional view of the transport mechanism shown in FIG. 3A.
Figure 4B:
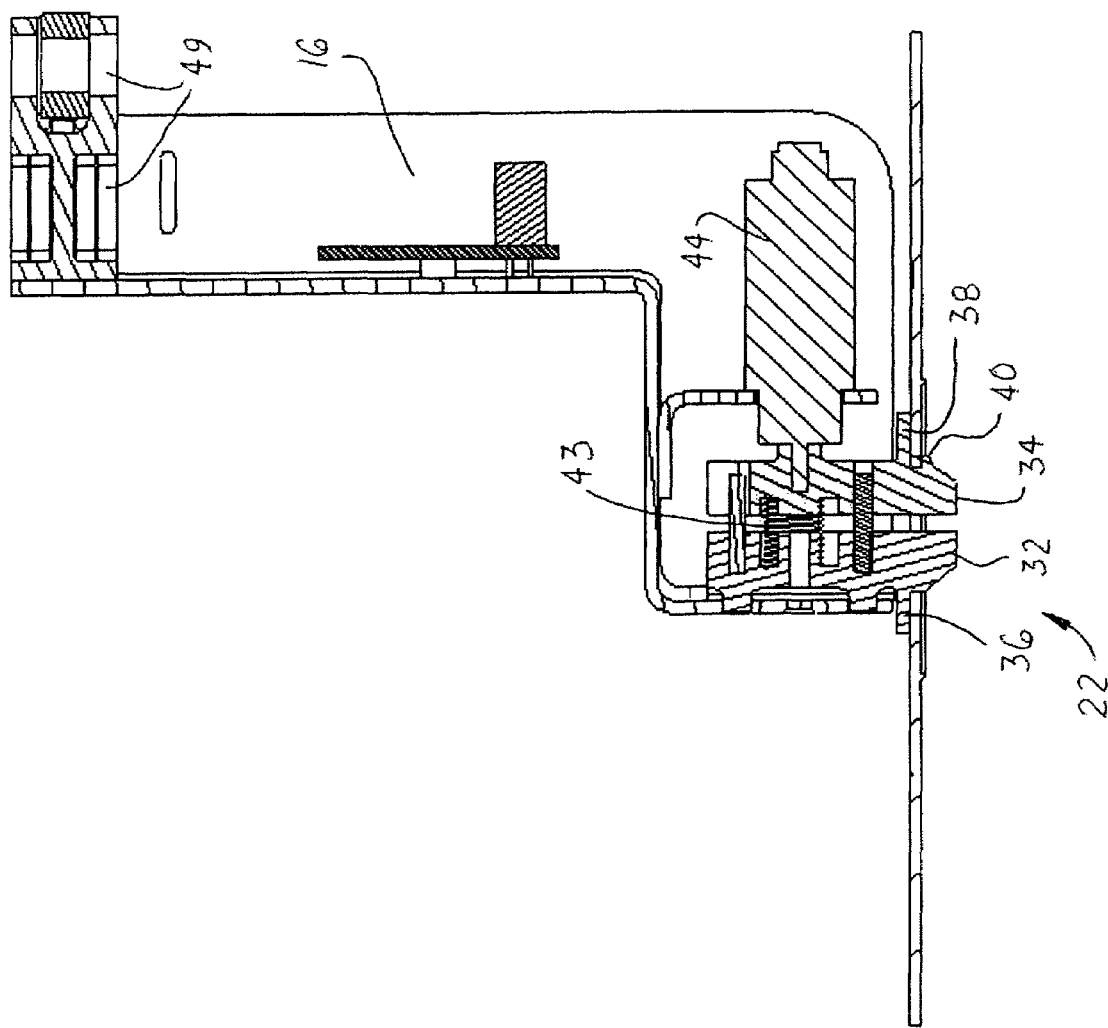
FIG. 4B illustrates a cross-sectional view of the transport mechanism shown in FIG. 3B.

In one preferred embodiment, referring to FIGS. 4A-B, the first, second or both fingers are further configured with one or more additional flanges 40 extending away from its respective finger and axially displaced from the first and/or second flange 36, 38. Preferably, the axial displacement is equal or greater than the approximate width of a storage device (e.g. disc). More preferably, the additional flange includes an edge adapted to fit or otherwise be self locating between two stacked discs and is adapted to separate the same upon placement therebetween. Accordingly, as the first and second fingers separate, the additional flange 40 slides between two discs to separate the same. Preferably, upon separation, the top disc is securely located between the first and/or second flange and the additional flange.

In view of the foregoing, it should be appreciated that upon engagement with a disc, e.g., movement of the fingers from a first position to a second position, the disc can be moved along the first slide member to different regions of the print device. Accordingly, when the transport mechanism reaches a desired location, the first and second fingers move back to the first position, thereby resulting in the disengagement of the disc with the engagement feature.

Advantageously, the transport mechanism may be further configured with one or more additional features, such as a disengaging feature, for assisting in the decoupling of the engagement feature with a disc by applying a force against the same. Suitable disengaging features includes resilient members, actuateable members, or otherwise, which may be configured to apply a continuous or selective force against an attached disc. It should be appreciated that other configurations are available.

Referring to FIGS. 3A-B, 4C and 5A-B, exemplary disengagement features 42 are shown, which are adapted to apply a selective force to an attached disc to disengage (or assist in disengaging) the same from the transport mechanism. In the embodiment shown, the disengagement feature is located on a surface of the transport mechanism facing a disc portion. It should be appreciated that the disengagement feature may be located at other locations. For example, the disengagement feature may be located on a side portion of the transport mechanism, on the first or second fingers (e.g., the first or second flanges), or otherwise.

Figure 4C:
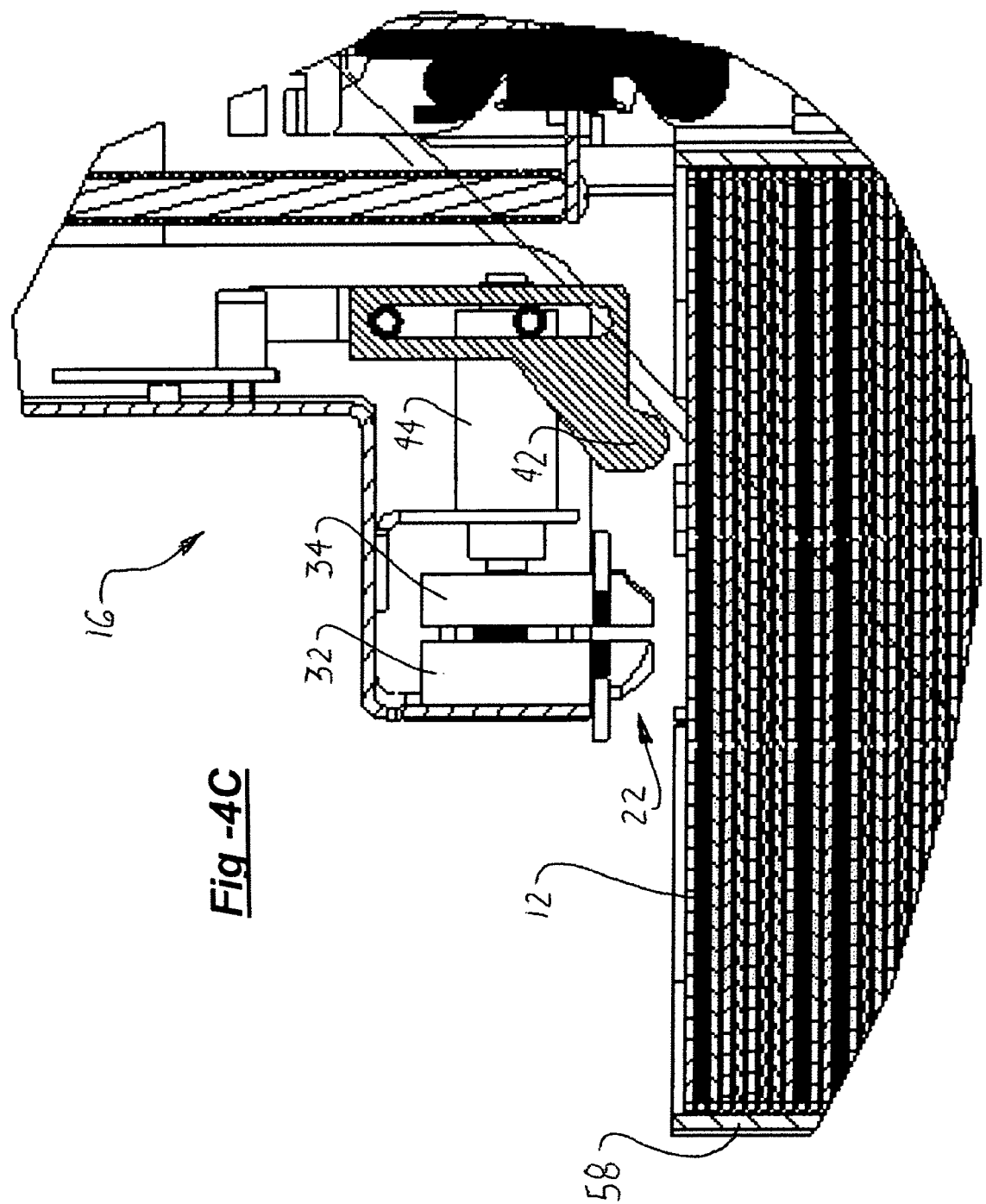
FIG. 4C illustrates another cross-sectional view of the transport mechanism shown in FIG. 3B.
Figure 5A:
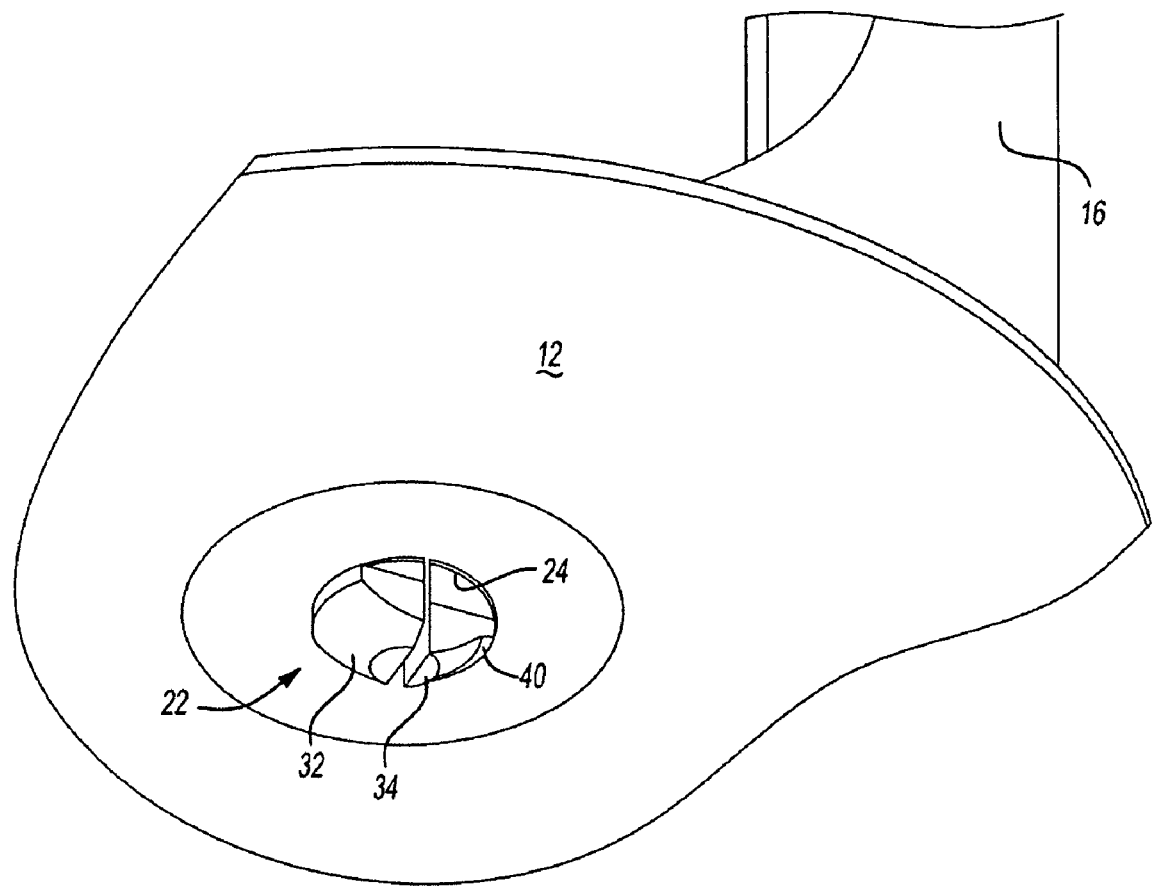
FIG. 5A illustrates yet another perspective view of the transport mechanism shown in FIG. 3A.
Figure 5B:
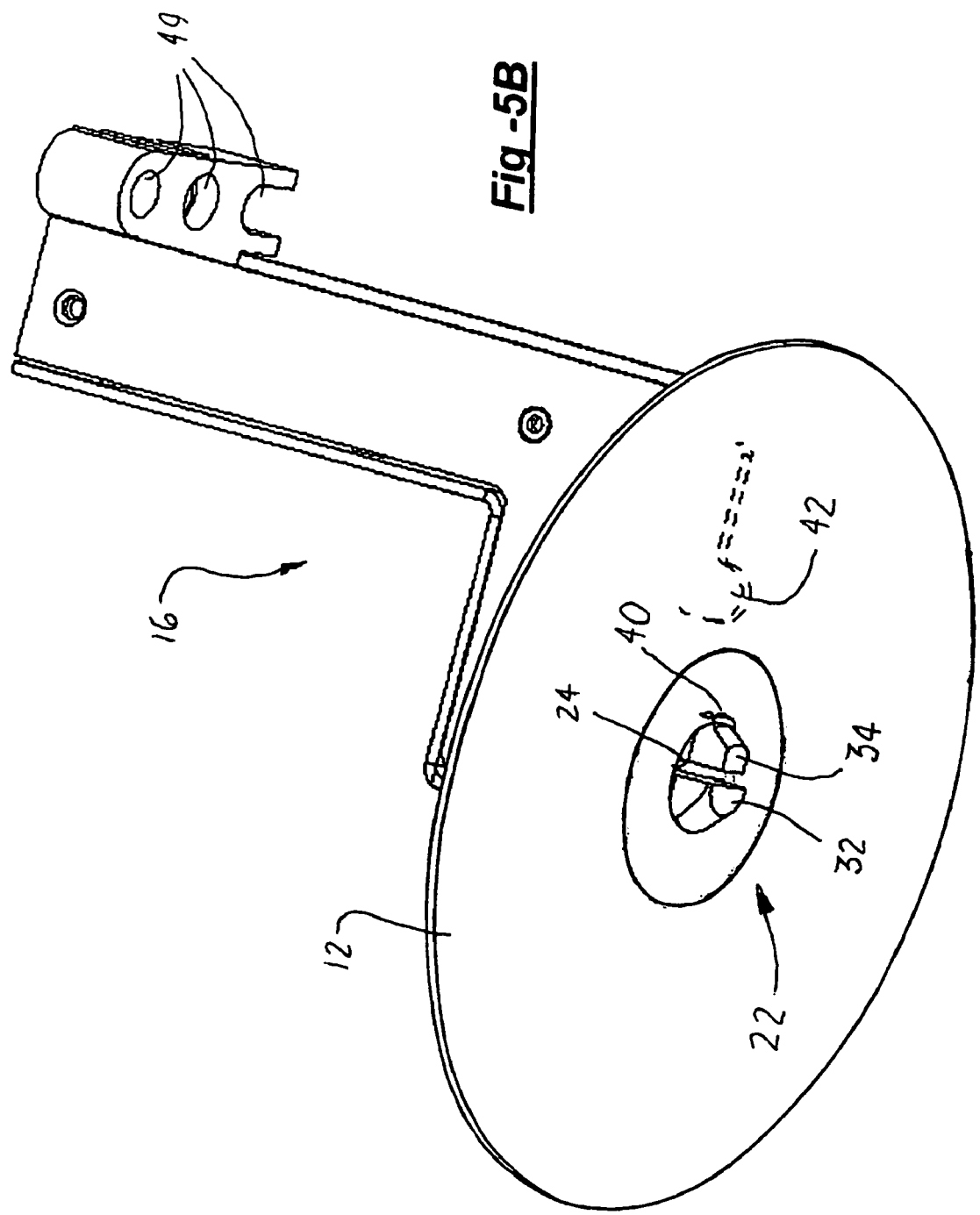
FIG. 5B illustrates yet another perspective view of the transport mechanism shown in FIG. 3B.

Movement of the first and second fingers, with respect to one another, may be achieved using any suitable drive means. Suitable drive means include mechanical, electrical, pneumatic, magnetic or otherwise. Referring to FIGS. 4A-C, in one preferred configuration, movement with respect to the first and second fingers is accomplished using a solenoid 44. In this configuration, the first or second finger is attached or otherwise connected to the solenoid, which is activateable upon an application of a current therethrough. It should be appreciated that the solenoid may be activated in an opposite direction to return the fingers to their closed position or alternatively, or in combination therewith, a spring 43 may be used to return or assist in returning the fingers an original position, which may include engagement with a disc. It should be appreciated that the spring may apply suitable friction force to cause the first and second fingers to engage and maintain position of the disc, with respect to the transport mechanism, during movement of the same.

The transport mechanism is further configured with means for movement generally perpendicular to the first axis. Preferably, this perpendicular movement is generally vertical with respect to the print device; however, other directions are within the scope of the invention. Advantageously, this movement allows the engagement feature to be lowered over a disc for engagement with the same. Subsequently, the disc may be lifted away from the disc source location and moved along the first slide member, and the first axis, to a desired location. Upon arrival to the desired location (e.g., a print location, record location, final destination or otherwise), the disc may be lowered to a select height and released for further processing of the disc or otherwise. It should be appreciated that, in at least one embodiment, as a result of decoupling of the transport mechanism and the print mechanism the transport mechanism is given greater movement flexibility for allowing greater vertical movement thereby allowing for placement of a greater number of disc storage devices at the source location.

Vertical movement of the disc engaging feature may be achieved using any suitable drive means 47. Preferably, the movement of the disc engaging feature includes movement along one or more vertically orientated bearing guide members 45, or the like, which extend through on or more openings 49 formed in the transport mechanism. Suitable drive means include mechanical, electrical, pneumatic, magnetism, the like or otherwise. In one preferred configuration, vertical movement of the disc engaging feature is achieved through a mechanical threaded rod (e.g., screw like) drive assembly that is generally vertically orientated. In this configuration, the disc engaging feature is movable with respect to the first slide member, wherein the engagement feature is attached or otherwise connected to the vertically orientated drive assembly, which is activateable upon an application of a current therethrough. It should be appreciated that the drive assembly may be activated in an opposite direction (e.g., from the second to the first position) to return the disc engaging feature to its original, previous, or other position.

In another configuration, vertical movement of the disc engaging featured may be achieve through the use of a solenoid feature, stepper motor or through any other suitable means.

It should be appreciated that the distance between vertical positions of the disc engaging feature may vary due to the changing height of stacked discs, located at the disc source location or otherwise. Accordingly, the vertical drive means is adapted to engage a disc at various heights. Advantageously, the transportation mechanism may further comprise one or more sensors for determining when the engaging feature is in a proper location for engaging or releasing a disc. It is further appreciated that in one specific example as shown in FIG. 1D, the disengagement feature 42 includes a sensor 43. Suitable sensors include pressure sensor, optical sensors, electro mechanical sensors, Hall Effect sensors or otherwise. By example, in one exemplary embodiment, the sensor is located on or associated with the flanges extending from the fingers of the engaging feature. The sensors determine when the engagement feature is flush with the disc so that upon separation of the first and second fingers, and hence between an upper and lower disc, the engagement feature will engage the upper disc.

Optionally, the transport mechanism may include a calibration means for aligning the transport mechanism with various component of the printer including disc supply or storage cartridges (or disc), trays associated with a print or recording device, combinations thereof or otherwise. As such, it is contemplated that the transport mechanism and/or disc engagement feature may be configured for alignment movement in one, two, three or more directions. Similarly, it should be appreciated that these components may be configured for rotation about one or more axes. Alternatively, or in addition to the adjustment of the transport mechanism and/or disc engagement feature, the print tray and/or the recording tray may also be configured for adjustment to provide this alignment feature.

In one configuration, the calibration of the transport mechanism, and hence the disc engagement feature, is achieved automatically as part of the control functions of the printer or otherwise. Optionally, the calibration may also be achieved manually, wherein the transport mechanism or disc engagement feature is configured for adjustable movement as previously describe. Of course, it should be appreciated that the any of the components may be configured for both automatic and manual adjustment.

The calibration of the components of the printer may be performed during manufacturing of the same and/or after manufacturing by the user of the device. Optionally, the printer further includes one or more sensors for determining the position of the engagement feature with respect to other components of the printer. In doing so, the engagement feature may be adjusted based upon known points of the other components in order to align the engagement feature with the other component.

In one configuration, the sensor is located on the engagement feature and is configured for interacting with a portion of the disc supply cartridge. In this configuration, the engagement feature is lowered into the supply cartridge until it reaches the approximate bottom of the supply cartridge. The engagement feature is then moved about the bottom the supply cartridge until the sensor falls within a recess portion 64 (e.g., square, round or otherwise) of the supply cartridge, wherein an electronic signal is transmitted indicating that the engagement feature has now been aligned with the supply cartridge. Also, by aligning the engagement feature with the supply cartridge, the engagement feature will also be aligned with the other components of the printer as the distance to those components, with respect to the supply cartridge, are already known based upon the specifications of the specific printer design.

However, it should be appreciated that this feature may be preformed with the engagement feature and other components of the printer as well such as print tray, recorder tray, storage cartridge or otherwise. Also, it should be appreciated that it is not necessary that a recess portion be used for alignment as any other know portion of a component (e.g., side edge or otherwise) may be used for alignment.

In view of the forgoing, the present invention is further adapted to perform multiple tasks to create a final disc product. Of these tasks, one particularly useful task includes recording information to the disc for subsequent retrieval. Such information may include music, videos, files, or other types commonly recorded through optical means. Accordingly, in a preferred embodiment, the print device further includes a digital recording device 46 adapted to record information to a disc. The recording device is configured to receive a disc from the transport mechanism, subsequently record information to the disc and make the disc available to the transport mechanism for subsequent tasks or otherwise. It should be appreciated that the information to be recorded to the disc may originated from another component, input port, as described herein, or otherwise.

Figure 1B:
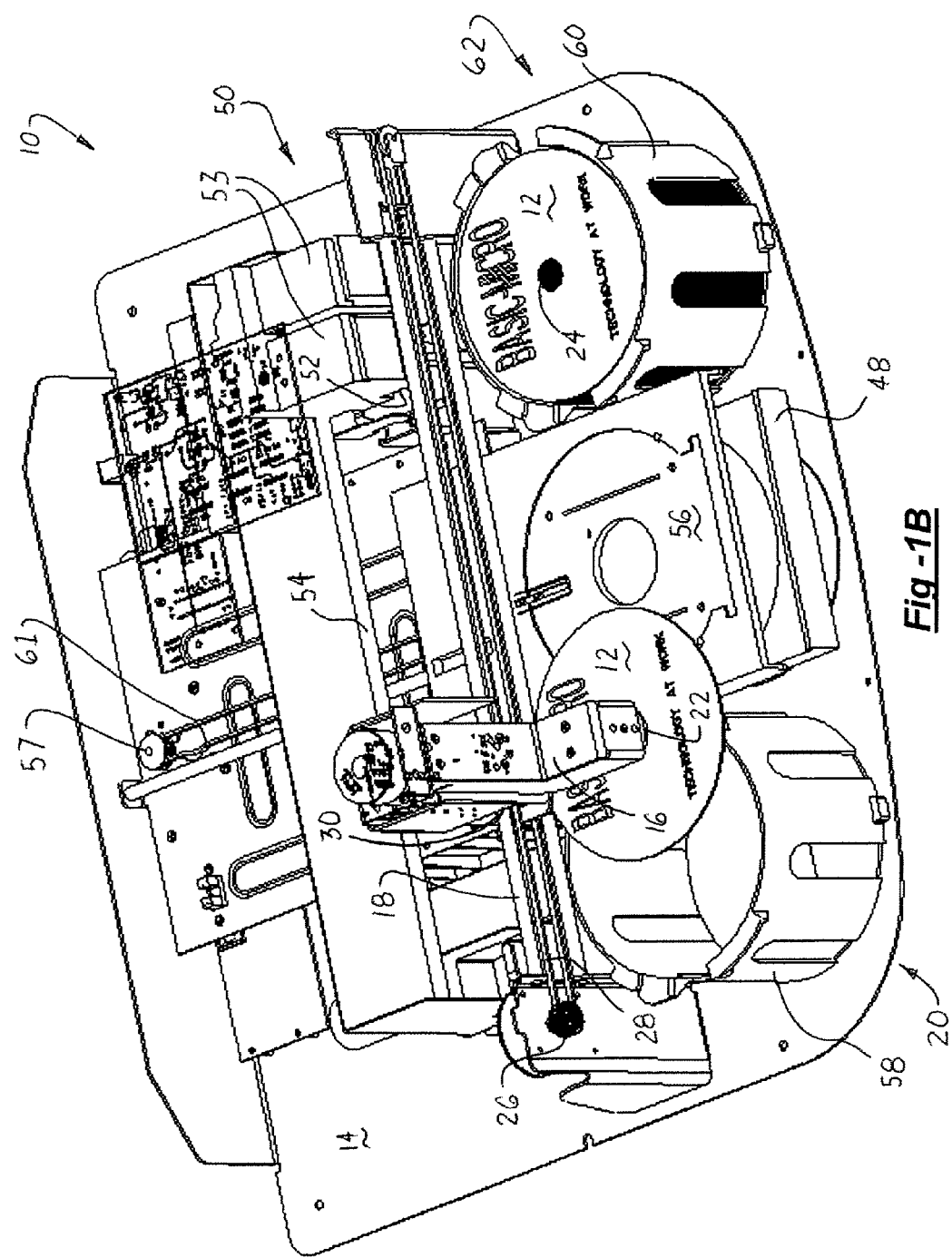
FIG. 1B illustrates a perspective view of another embodiment of the present invention.
Figure 1D:
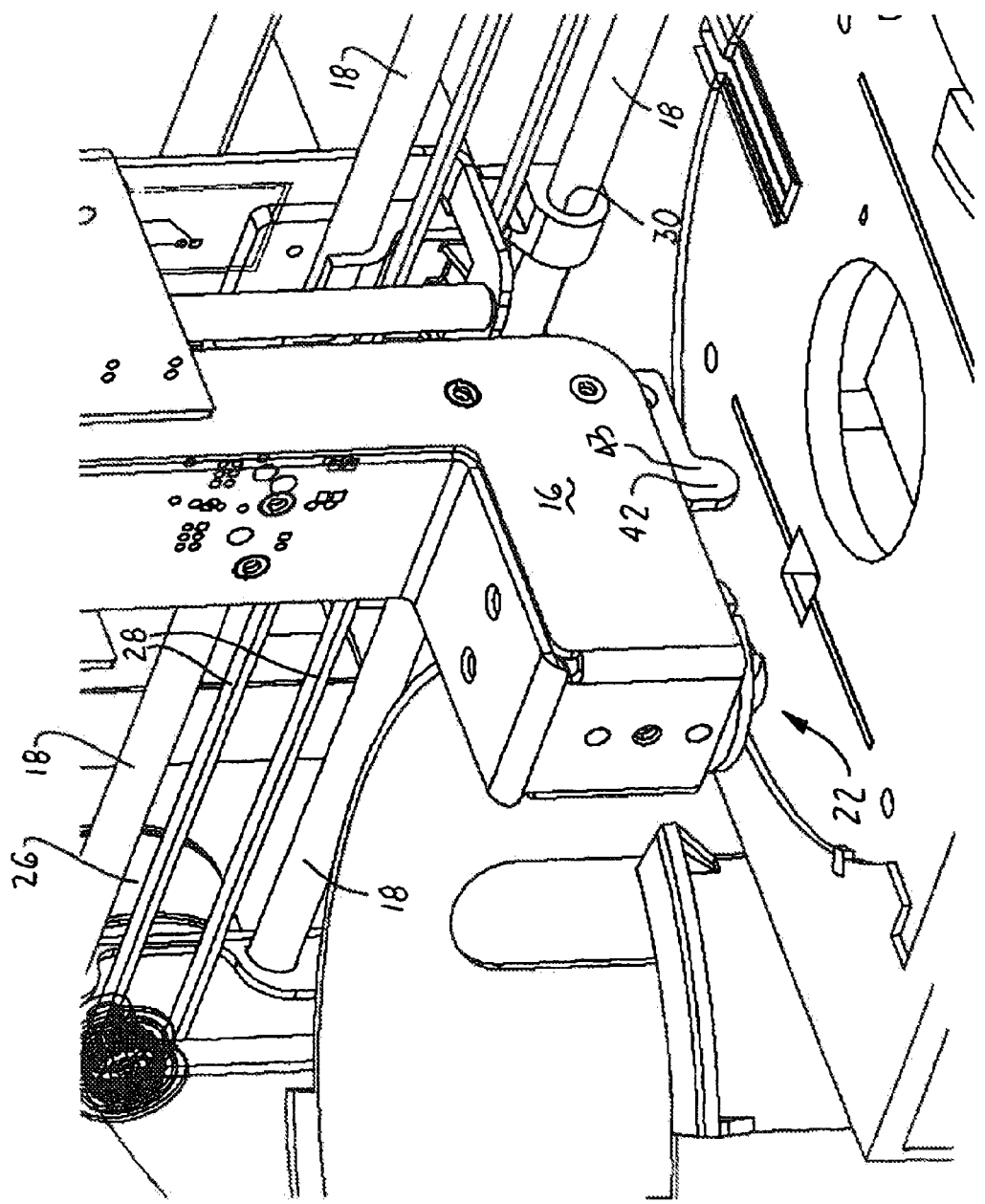
FIG. 1D illustrates yet another perspective view of the embodiment shown in FIG. 1B.
Figure 2A:
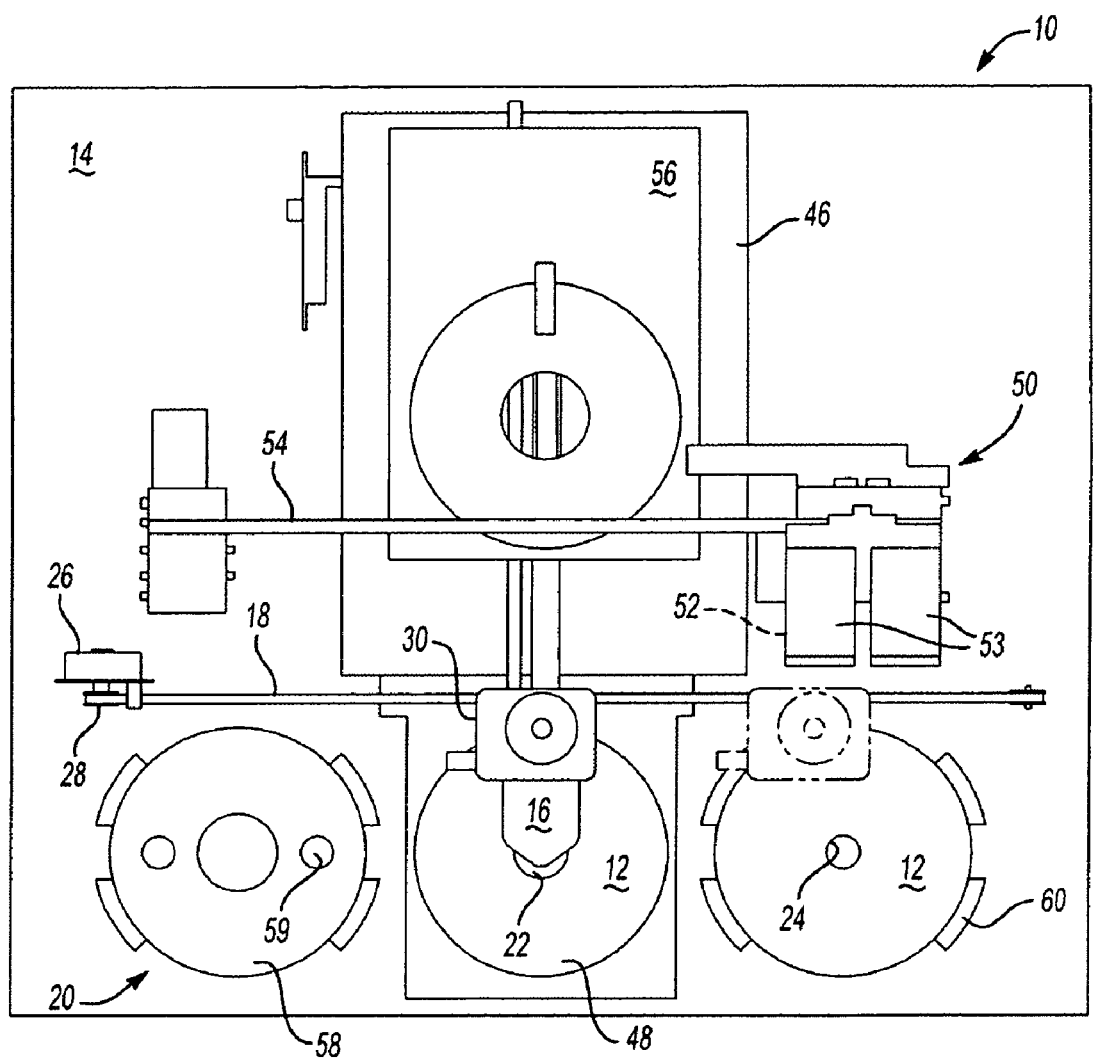
FIG. 2A is a top view of the embodiment shown in FIG. 1.
Figure 2B:
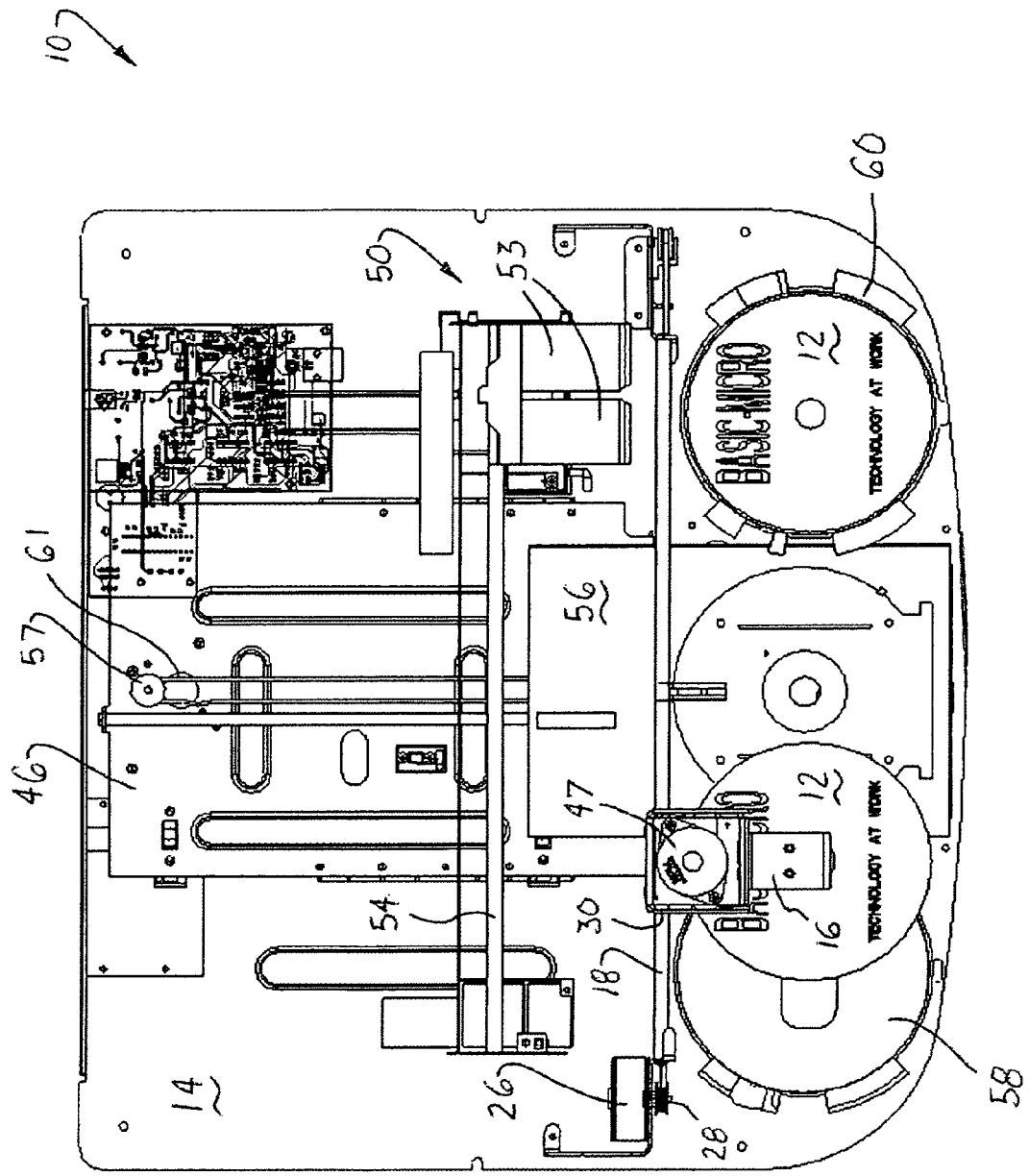
FIG. 2B is a top view of the embodiment shown in FIG. 1B.
Figure 3A:
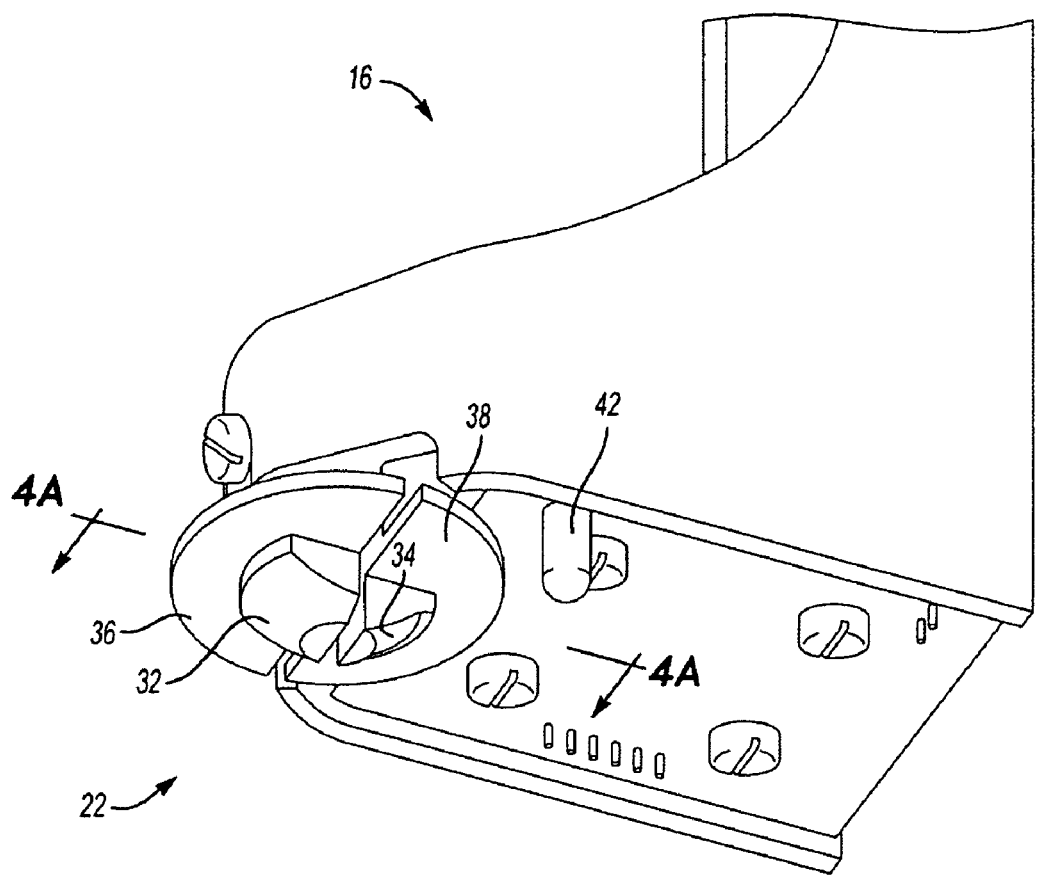
FIG. 3A illustrates a perspective view of a first suitable transport mechanism of the present invention.

Referring to FIGS. 1A-B, a suitable disc recording device, for recording digital information to a disc, is illustrated. The disc recording device is mounted to the housing and preferably located adjacent to the first slide member. The disc recording device further includes a tray 48 that extends below the first slide member. In this exemplary embodiment, the tray is adapted to reside in a first retracted position, wherein information may be recorded, and extend to a second position for receiving and/or providing a disc to the engaging feature. It should be appreciated that movement of the tray may be achieved using common techniques used in compact disc and digital video disc players and recording devices, or otherwise.

In operation, the recording device extends the tray to an extended position for receiving a disc from the transport mechanism. If not already located there, the transport mechanism moves an engaged disc to a position substantially over the tray of the recording device. The disc engaging feature lowers the disc into the tray and releases the disc. The engaging feature then moves away from the tray and the tray is retracted to the first position for recording. Upon completion of recording to the disc, the tray extends to an extended position so that the transport mechanism can retrieve the disc for further processing or otherwise.

Another useful task that may be performed with the present invention includes printing a design, text or otherwise to a disc for identification purposes, or otherwise. Accordingly, the print device may further include a print assembly 50 adapted to print to a disc using common printing techniques (e.g., inkjet laser or otherwise). In a preferred embodiment, the print assembly includes one or more print head 52 and ink cartridges 53 having colors commonly associated with inkjet printing (e.g., black, white, reds, blues, greens, combinations there of as otherwise). The print heads are mounted to a second slide member 54, which preferably extends along at least a portion of the housing and is mounted or otherwise secured thereto. It should be appreciated that the second slide member may include any of the features of the first slide member. The mounting of the print assembly to the second slide member provides movement along a second axis, which preferably is substantially parallel with the first axis but does not interfere with the movement of the transport mechanism located on the first slide member. While the height of the first and second members may be the same, it should be appreciated that the height of the first slide member may be maximized so as to access an optimum amount of discs at the disc supply source. Accordingly, this increases the amount of disc that can be stored at the discs supply and storage location.

It should be appreciated that the print head further includes a suitable drive means and linkages for movement of the print head along the second slide member. Suitable drive means and linkages may include any of the devices used for movement of the transport mechanism or any other suitable drive and/or linkage found in the art of printing devices and more particularly the drive configuration of print heads.

Advantageously, the print heads are adapted to print to a disc portion located within the print tray. Suitable print heads that can be used with the present invention can be found in the field of inkjet printing. However, printing to a disc using laser or thermal print technology is also within the present invention. In fact, it is contemplated that laser printing technology may be used to print to a disc, which may include color. Regardless to the print means used, it should be appreciated that the print device may print using any of the colors or color combinations found in the print industry.

As previously discussed, the one or more print heads are adapted for movement along the second slide member and are adapted for printing directly to a disc located therebelow. Accordingly, the print assembly further includes a print tray 56 adapted to receive a disc and provide movement therefor, which preferably is substantially perpendicular to the movement of the printer heads. Advantageously, the print tray is adapted for movement along an axis to effectuate printing. For example, in a preferred embodiment, the print tray is moveable to a first position which is fully extended and a second position which is fully retracted. It should be appreciate that during printing, the print tray will move between the first and second position to provide print capability throughout the entire disc located within the print tray.

In a preferred embodiment, the tray is configured with a recess having a center adapted to be substantially concentrically aligned with a disc placed therein. Accordingly, in the extended position, the tray is adapted to receive a disc from the transport mechanism. For example, it is contemplated that when the disc tray is in a fully extended position, the recess portion is concentrically aligned with the center of the disc portion attached to the transport mechanism located thereabove. In this respect, the transport mechanism aligns a disc to the center portion of the print tray and places the disc into the tray. In one configuration, placement of the disc into the print tray comprises: lowering the engagement feature to the position just above the print tray, releasing the disc into the tray, and raising the engaging feature to a first (e.g., original) position. As previously discussed, the transport mechanism or engagement feature may be calibrated to align the same with the print tray.

Movement of the print tray can be effectuated using any suitable drive mechanism 57, and any linkage thereto 61, adapted for specific positioning of the print tray, which may include reciprocal movement. Suitable drive mechanisms are known in the art of printing and may include stepper motors or otherwise. In a preferred embodiment, to effectuate specific positioning of the print tray, movement of the print tray is sequenced with the movement and printing of the print head. Preferably, the movement of the print tray and the print head are effectuated through a controller adapted to cause the print tray to move to one or more positions, as further discussed herein, so that the one or more print heads can print to a specified region of the disc.

In a preferred embodiment, one or more of the components of the print device are controllable through a controller. The controller of the print device may be included as a component of the print device or alternatively, the controller may be included with a separate component, e.g. not incorporated within the print device. However, in a preferred embodiment, the controller is adapted to receive a signal from a source, such as a computer or otherwise, such that function of the print device is based upon the received signal. Furthermore, preferably the controller causes synchronized operation of the components of the print device (e.g., printing, recording, movement or otherwise) to maximize print efficiency by minimizing cycle time of any task to be performed.

For example, in one embodiment, it should be appreciated that the print device may be communicatively connected to a device adapted to provide information pertaining to desired functions of the print device. Suitable devices include processing unit (computers or otherwise) or the like, which preferably provides a user interface for allowing a user to selectively control the functions of the print device. Accordingly, the print device further includes one or more ports for providing communication between the controller of the print device and the user interface, when the controller is an integral part of the print device. Suitable communication devices include Universal Serial Bus (USB), parallel port, serial port, the like or otherwise.

Alternatively, or in conjunction therewith, the print device may comprise a data interface adapted to receive information from a data storage device pertaining to one or more printing and/or recording tasks. Suitable interfaces include disc drives, ScanDisc, Compact Flash, MicroDrive, Smart Media Card, MultiMedia Card, Memory Stick, Secure Digital Card, Radio Frequency Identification (RFID), or other type of media interfaces for the accessing of information on a removable storage device.

The printer may include software for communicating with these or other data storage devices. Furthermore, the printer may include software for performing other printer functions and/or for communicating with a computer or otherwise.

The controller of the print device may be programmed with one or more suitable software programs to assist in effectuating the printing of the print device and/or the recording of information onto a disc or otherwise. Preferably, the control device is adapted to be compatible with program languages such as C/C++, VisualBasic, Java, Pascal, Modula II, ADA, Fortran, Forth, or otherwise. Furthermore, other software may be included to control the device, perform maintenance thereto or otherwise.

Advantageously, the print device may be configured with one or more additional features to further enhance the print capabilities of the device. One example of an additional feature includes a removable disc supply cartridge 58 adapted to receive and hold discs at the disc location site. When installed, the disc supply cartridge is configured to be aligned with a disc attached to the engagement feature of the transport mechanism, when located thereabove. In a preferred embodiment, the disc supply cartridge includes an engagement feature 59 for assisting in attachment or alignment of the disc supply cartridge with the housing of the print device. The disc storage cartridge preferably is adapted to hold at least 10 discs, more preferably at least 25 discs, and even more preferably at least 50 discs.

Another additional feature of the present invention comprises a disc storage cartridge 60 adapted to receive completed disc being recorded to, printed to, recorded and printed to or otherwise. When installed at a disc storage location 62, the disc storage cartridge is configured to be aligned with the disc attached to the engagement feature of the transport mechanism, when it is located thereabove. In a preferred embodiment, the disc storage cartridge includes an engagement feature for assisting in attachment or alignment with the housing of the print device. Preferably, the disc storage cartridge is adapted to receive at least the same amount of disc located in the disc storage cartridge. As such, the disc storage cartridge preferably is adapted to hold at least 10 discs, more preferably at least 25 discs, and even more preferably at least 50 discs.

Yet another feature of the present invention includes an alternate dispensing site for the dispensing of one or more disc. In such a configuration, it is contemplated that, as oppose to placement of a disc within the disc storage cartridge, the disc may dispensed from the printer. This may be particularly advantageous if the recording, printing or other task is not properly completed to the user's specifications.

For example, referring to FIG. 6, the printer may include a dispensing site 66 for placement and optionally ejection of a disc from the printer. The site may include a ramped surface 68, which may be recessed, for assisting in the ejection of the disc and may also optionally include a bin, which may or may not be attached to the printer, for receiving the ejected disc. Optionally, the recorder tray may also include an engagement feature, such as flange 70, attached or otherwise integrated with the front portion of the recorder tray, which is adapted to engage and move a disc placed at the dispensing site to a location exterior to the printer. The flange may extend into a groove which runs along the ramp portion. This groove insures that the flange remains in contact with the disc.

In one exemplary method, the operation of the print device is demonstrated as follows. A user selects one or more tasks to be performed by the print device, via a user interface. As previously mentioned, such tasks may include recording to a disc, printing to a disc, or both. The user interface may be located proximate to the print device or remote to the print device (e.g., via a network connection, Internet or otherwise). It should also be appreciated that the user interface may comprise an integral component of the print device (e.g., located externally or otherwise).

Prior to assignment of a task to be performed by the print device, the user places one or more discs at the disc supply location. Preferably, the discs are placed in a disc supply cartridge, as discussed herein. Similarly, disc storage cartage may be attached or otherwise placed at the disc storage location, also as discussed herein. Optionally, the amount of discs placed in the disc storage cartridge corresponds to the desired selected storage devices the user wishes to perform tasks to. However, for printing or recording tasks involving a greater number of discs, which can be placed within the disc supply or storage cartridge, a cartridge can be quickly exchanged with substantially no interruption of the print and/or recording operation.

Through the user Interface, the user selects one or more tasks to be performed to one or more discs. Often, as discussed below, the task includes both the recording and printing of information. For example, the tasks may include transferring data from a source to one or more discs, in a digital format. Also, the tasks may also include printing to the recorded discs, which advantageously corresponds to the information transferred to the disc. Once the tasks have been selected, one or more signals are transferred to the controller of the print device to effectuate synchronized operation of the print device corresponding to the tasks requested.

For example, in one method of operation, upon transmission of the task signal to the print device, the transport mechanism moves along the first slide member to the disc supply cartridge, wherein the engagement feature is aligned over the holes of the one or more discs located in the supply cartridge. The engagement feature is lower until the flanges, extending from the first and second fingers, become flush with the top disc residing in the disc supply cartridge. The first and second fingers are then separated so that the top disc is separated from the adjacent disc residing in the disc supply cartridge. Preferably, this separation is effectuated through the additional flange located on the first and/or second finger, wherein the disc is located between the first and second flanges and the additional flange. The engagement feature then raises with a disc to its original position, e.g., above the disc supply cartridge, so as to prevent interference with the cartridge during transferring of the engaged disc.

The disc is moved along the first slide member to the disc recording device. Preferably, the tray of the disc recording device is extended so that the center portion of the disc attached to the engaging feature is substantially aligned with the center of the tray of the disc recording device. The engaging feature is then lowered proximate to the tray and release by moving the first and second fingers together and optionally using the disc disengaging feature. Upon placement of the disc into the recess formed on the tray, the engaging feature returns to an original position and the tray retracts into the disc recording device, wherein information is then recorded onto the disc.

Upon completion of recordation of data to the disc, the tray extends and the disc engaging features lowers and once again engages the disc and raises it to the original position. The disc printing tray then moves into an extending position and the transport mechanism, if necessary, aligns the center of the disc with the center of the recess formed in the disc printing tray. The engagement feature then lowers the disc onto the print tray in a similar fashion that was performed with the disc recording device. The engagement feature releases the disc and returns to an upward portion.

The disc printing tray then moves in synchronization with the print heads of the print assembly to effectuate printing to the surface of the disc. During this process, because of the decoupling of the transport mechanism and the print assembly, the transport mechanism moves back to the disc supply cartridge to retrieve another disc and place the disc into the disc recording device. It should be appreciated that this may be performed during printing to the disc.

Upon completion of the printing to the disc, and advantageously during recordation of data to the disc located in the recording device, the print assembly tray extends to its extended position. The transport mechanism then aligns itself with the disc located in the print tray, if necessary, and engages the completed disc. The disc is then transported to the disc storage cartridge or otherwise and subsequently placed in the cartridge, preferably in a similar fashion to that of the placement into the recess portion of the print tray and recording tray.

The transport device then moves to the recording device and removes the disc from the recording device tray and places it into the print tray to be printed to. It should be appreciated that this cycle continues until the all of the selected tasks have been completed or the disc from the disc supply cartridge has been exhausted. It should further be appreciated that, if necessary, during the above operation, the disc supply cartridge may be removed for replacement as discussed herein. Likewise, the disc storage cartridge may be removed for removal of the completed cartridge and replace with an empty disc storage cartridge.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only three of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A printer adapted tor printing to a disc surface, the printer comprising:
    a transport mechanism movable along a first axis, the transport mechanism including an engagement feature for selective engagement of one or more discs from a disc source region;
    a print assembly for printing to at least one disc, the print assembly including one or more print heads movable along a second axis, and a movable print tray adapted to receive at least one disc from the transport mechanism;
    a control unit adapted to control functions of the transport mechanism, the print assembly or both; and
    a housing for providing support to one or more components of the printer,
    wherein the transport mechanism and the one or more print heads are adapted to move independent of each other, and wherein the first axis is displaced relative to the second axis so that the movement of the disc transport along the first axis does not interfere with the movement of the one or more print heads along the second axis.

2. The printer of claim 1, further comprising a digital recording device having a movable record tray adapted to receive and record to at least one disc from the transport mechanism.

3. The printer of claim 2, wherein the transport mechanism is adapted for movement between the disc source region and a disc storage region.

4. The printer of claim 3, wherein the disc source region comprises a disc supply cartridge removably attached to the housing of the printer, and wherein the disc storage region comprises a disc storage cartridge removably attached to the housing of the printer.

5. The printer of claim 4, further comprising an one or more alignment features for aligning the engagement feature with the disc supply cartridge, disc storage cartridge, print tray, record tray, or combinations thereof.

6. The printer of claim 5, wherein the one or more alignment features are automated and controllable through the control unit.

7. The printer of claim 1, wherein the engagement feature comprises two opposing members adapted for movement with respect to one another to form at least one diameter greater than the diameter of the one or more discs.

8. The printer of claim 7, wherein the two opposing members include at least one flange opposite one another and wherein at least one of the two opposing members include at least one additional flange, wherein the flanges opposite one another are axial spaced from the additional flange by a distance proximate to the thickness of one of the one or more disc.

9. The printer of claim 1, further comprising a dispensing site for removal of individual disc from the printer.

10. The printer of claim 9, wherein the record tray further comprises a flange for engagement with disc placed at the dispensing site to remove the same from the printer when the record tray is extended.

11. The printer of claim 10, further comprising a bin for receiving dispensed disc from the dispensing site.

12. A disc printer and recording device, the device comprising:
    a housing for providing support to one or more components of the printer;
    a disc supply cartridge located at a disc storage region and a disc storage cartridge located at a disc storage region, wherein the disc supply cartridge and the disc storage cartridge are removably attached to the housing and configured for receiving 25 or more discs; and
    a transport mechanism movable along a first axis, the transport mechanism including an engagement feature for selective engagement of one or more discs from the disc supply cartridge and move the selected disc to a print location, record location and subsequently to the disc storage cartridge;
    a print assembly for printing to the selected disc, the print assembly including one or more print heads movable along a second axis and a movable print tray adapted to receive the selected disc from the transport mechanism, wherein the one or more print heads and print tray are adapted for synchronized movement to cause printing to a disc located in the print tray;
    a digital recording device for recording to the selected disc, the digital recording device having a movable record tray adapted to receive and record to the selected disc from the transport mechanism;
    a control unit adapted to control functions of the printer and for communications with a computer;
    wherein the transport mechanism and the one or more print heads are adapted to move independent of each other, the first and second axis being displaced and parallel to one another, and wherein the record tray and the print tray are located adjacent to one another and adapted for movement perpendicular to the first and second axis; and
    wherein the first axis is displaced relative to the second axis such that the print assembly permits printing to a disc without interference to the recording of one or more discs, the transporting of one or more discs, or a combination of both.

13. The printer of claim 12, further comprising an one or more calibration features for aligning the engagement feature with the disc supply cartridge, disc storage cartridge, print tray, record tray, or combinations thereof.

14. The printer of claim 13, wherein the one or more calibration features are automated and controllable through the control unit.

15. The printer of claim 14, wherein the one or more calibration features include a sensor located on the engagement feature which is adapted for determining the position of the engagement feature with respect to at least one known point of the disc supply cartridge, disc storage cartridge, print tray, record tray, or combinations thereof.

16. The printer of claim 15, wherein base upon alignment of the engagement feature with the disc supply cartridge, disc storage cartridge, print tray or record tray, at least one position of the other said disc supply cartridge, disc storage cartridge, print tray or record tray are known.

17. The printer of claim 12, further comprising a dispensing site for removal of individual disc from the printer, wherein the dispensing site includes a ramp extending towards a front portion of the printer.

18. The printer of claim 17, wherein the record tray further comprises a flange for engagement with disc placed at the dispensing site to push the disc along the ramp to cause the disc to exit the dispensing site.

19. The printer of claim 12, wherein the engagement feature includes moveable members having at least one flange adapted to separate a single disc from a stack of disc located within the disc supply cartridge.

20. The printer of claim 1, wherein the print assembly permits printing to a disc without interference to the recording of one or more discs, the transporting of one or more discs, or a combination of both.

* * * * *